May 22, 1962 J. L. DE BOO 3,035,471

VARIABLE WIDTH TAPE GUIDE MEANS FOR PERFORATING MACHINE

Filed Sept. 22, 1958 2 Sheets-Sheet 1

INVENTOR
JEROME L. DeBOO

BY R. C. Perry
ATTORNEY

May 22, 1962 J. L. DE BOO 3,035,471

VARIABLE WIDTH TAPE GUIDE MEANS FOR PERFORATING MACHINE

Filed Sept. 22, 1958 2 Sheets-Sheet 2

INVENTOR
JEROME L. DeBOO
BY
R.C. Terry
ATTORNEY 3,035,471

VARIABLE WIDTH TAPE GUIDE MEANS FOR PERFORATING MACHINES

Jerome L. De Boo, Barrington, Ill., assignor to Teletype Corporation, Chicago, Ill., a corporation of Delaware Filed Sept. 22, 1958, Ser. No. 762,305
6 Claims. (Cl. 83—449)

This invention relates to printing telegraph apparatus and more particularly to an adjustable edge guide for tape in the punch block of a tape perforator.

In the adaptation of printing telegraph apparatus to use in data handling systems, it has been found desirable to provide mechanism for handling tape having five, six, seven or eight levels for use in various portions of the data handling system. It has become standard practice to provide these tapes in three widths, that is, 1⅙″ wide, ⅞″ wide and 1″ wide. The five-level tape is 1⅙″ wide; the six and seven-level tapes are ⅞″ wide and the 8 level tape is 1″ wide. Since the position of the perforations across the tape is highly critical, in order to insure that the tapes will properly control sensing mechanisms, it has in the past been necessary to provide three separate punching mechanisms for punching these four types of tape.

It is an object of the present invention to provide a tape perforator having an adjustable punch block.

Another object of the invention is to provide a tape perforator having a punch block, the tape guiding edges of which may be set to selective positions to handle different widths of tape in the same apparatus.

A still further object of the invention is to provide a punch block for a tape perforator which may be adjusted to handle any one of three different widths of tape by a single manipulative action.

In accordance with one embodiment of the invention, a punch block is provided with a tape slot having tape edge guides that may be adjusted to accommodate three different widths of tape by manipulating a single lever. The edge guide at one side of the tape slot comprises a resilient member for engaging an edge of the tape to press the opposite edge of the tape against guiding surfaces at the opposite side of the slot and this resilient member, upon manipulation of the lever may be moved to any one of a plurality of positions. The tape-edge guiding surfaces at the opposite side of the tape slot are formed on a stationary member and on a slidable member which is U-shaped and has portions extending on each side of the stationary member. Each portion of the U-shaped member has a tape guiding surface on its end and, when the lever is manipulated, this member may be advanced into the slot to provide two aligned guiding surfaces for the tape and when retracted will expose the stationary member which will then serve as the guide for the edge of the tape.

Figure 1:
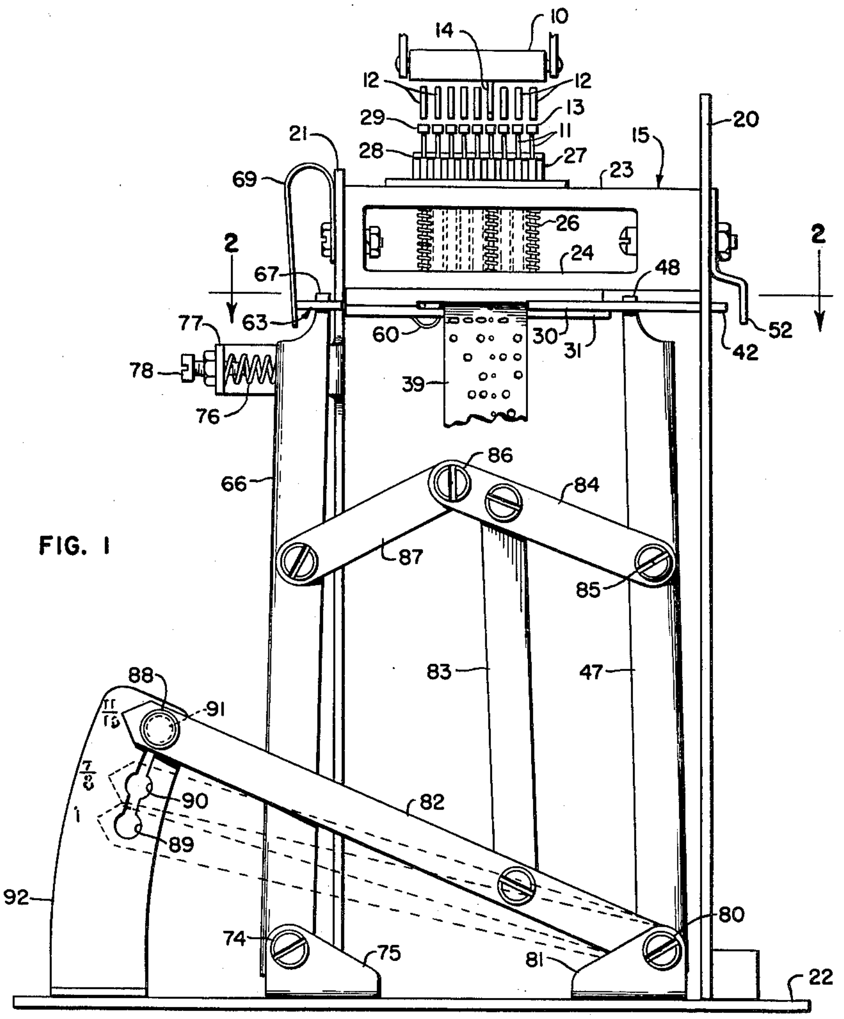

A more complete understanding of the invention may be had by reference to the following detailed description when considered in conjunction with the accompanying drawings wherein:

FIG. 1 is a front elevational view of the exit end of a tape punch having a tape block made in accordance with the present invention.

Figure 5:
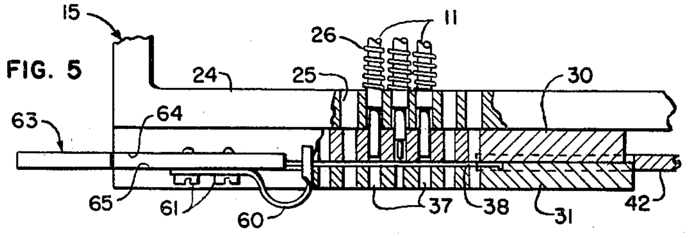
Figure 2:
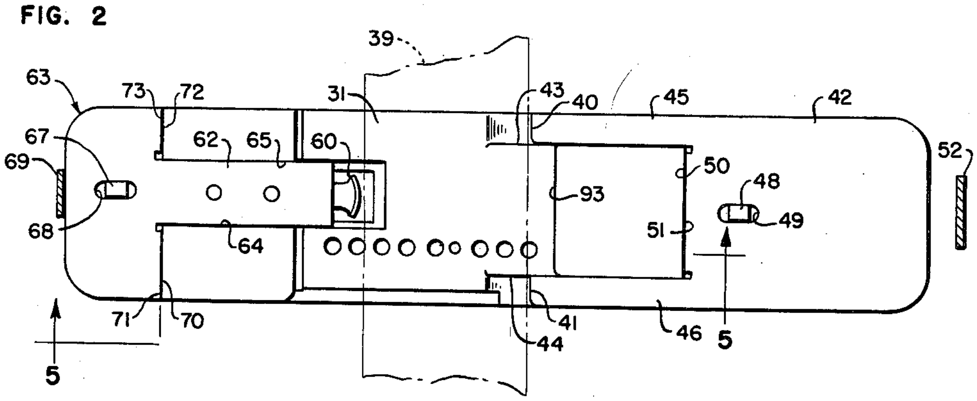
Figure 3:
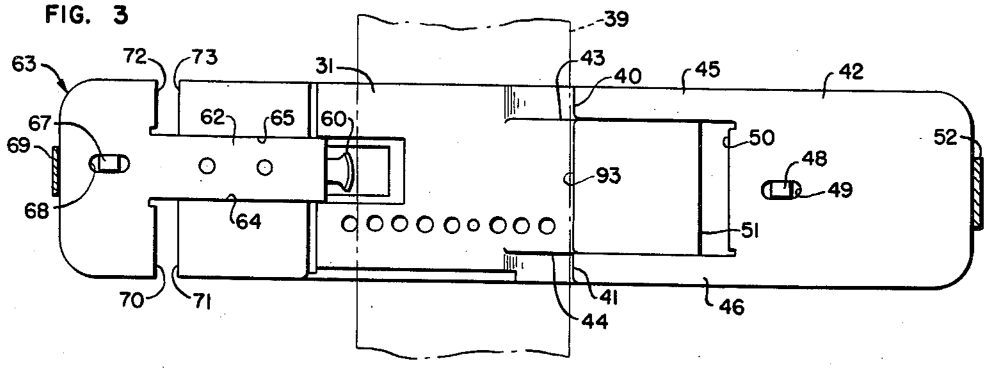
Figure 4:
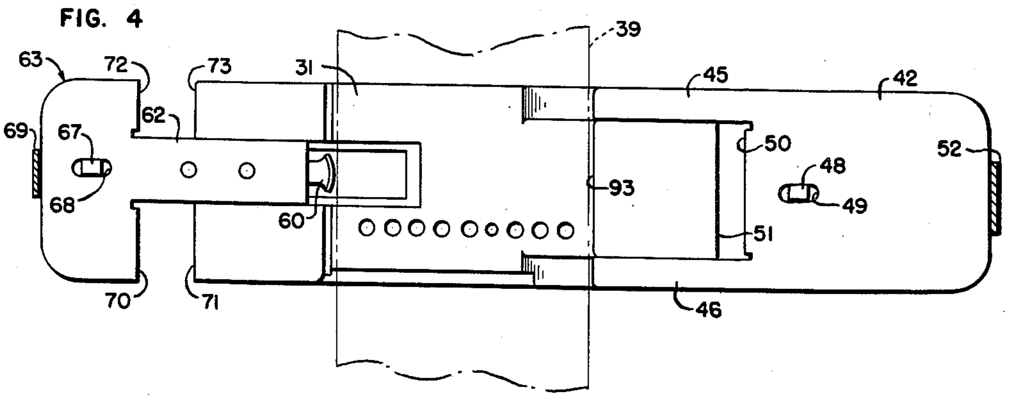

FIGS. 2, 3 and 4 are plan sectional views, on an enlarged scale, taken substantially along the lines 2—2 of FIG. 1, in the direction of the arrows, showing the tape block guides in their three adjusted positions, and FIG. 5 is a partial sectional view taken substantially along the line 5—5 of FIG. 2, in the direction of the arrows, showing details of the punch block.

Referring now to the drawings wherein like reference characters designate the same parts throughout the several views, particular reference being first had to FIG. 1 wherein there is shown, a reciprocatably mounted punch hammer 10 which extends above a plurality of punch pins 11 that may be selected for actuation by interposer member 12. The interposer members 12 may be actuated by any suitable selector mechanisms and, when selected for actuation, will be moved out into position between the heads 13 of the punch pins 11 and the hammer 10 whereby, when the punch hammer 10 is moved downwardly in the operation of the perforating apparatus, those punch pins 11 which have been selected for operation by their respective interposer members 12 will be driven downwardly. The punch hammer 10 has associated with it, one punch actuator 14 which is operated on each operation of the punch hammer 10 to perforate tape feed holes in the tape. There are provided three interposer members 12 to the right of the punch actuator 14 and five interposer members 12 to the left of the punch actuator 14. When five-level tape is being perforated in the apparatus, only the two interposer members 12 to the right of the punch actuator 14 and the three interposer members to the left of the punch actuator 14 (FIG. 1) are used, and these interposer members 12 may be selected by any suitable mechanism well known in the printing telegraph art.

An open rectangular punch block 15 is supported on a pair of suitable standards 20 and 21 which are in turn supported on a base 22. The punch block 15 has an upper portion 23 and a lower portion 24 in each of which there are apertures, such as the apertures 25 (FIG. 5) in the lower portion 24, for guiding the punch pins 11. Each of the punch pins 11 has associated with it, a restoring spring 26 which bears against the lower portion 24 of the punch block 15, encircles its associated pin 11 and engages a shoulder (not shown) on the pin 11 to restore the pins after they have been actuated to perform a perforating operation. As seen in FIG. 1, the upper portion 23 of the punch block 15 has mounted on it, a guide plate 27 having a bent-over portion 28 which engages a reduced shank portion 29 on each of the pins 11 and serves to limit the upward movement of the pins 11 under the influence of their individual springs 26.

The under surface of the lower portion 24 of the block 15 has fixed to it, a punch pin guide plate 30 which also serves as a tape guide in cooperation with a die plate 31. The die plate 31, as seen most clearly in FIG. 5, has die apertures 37 formed in it in alignment with the apertures in the guide plate 30 and in the punch block 15. The die plate 31 also has a shallow tape guiding slot formed in its upper surface as indicated at 38 for cooperation with the underside of the die plate 30 in guiding a tape 39. This tape guiding slot 38 is made wide enough to accommodate any of the three widths of tape, that is, the 1⅙″ wide, the ⅞″ wide and the 1″ wide tapes. The tape shown in FIG. 1 is a 5-level tape which, of course, is an 1⅙″ wide tape.

In order to accommodate minor variation in tape width which may be caused by moisture conditions or inaccuracies in the forming of the tape, it is preferable to have one side of the tape guide comprised of a solid, non-resilient member and the other side of the tape guide comprised of a slightly-resilient member. Accordingly, as shown in the drawings, the right-hand side guides for the tape are non-resilient, whereas the left-hand side guide is a resilient member. When the apparatus is perforating tape of the narrowest or 1⅙″ width, the right edge of the tape 39, shown most clearly in FIG. 2, is guided by a pair of surfaces 40 and 41 formed on a slide member 42. This slide member 42 is mounted for movement between cooperating surfaces of the punch pin guide plate 30 and the die plate 31 which have been formed by milling the under surface of the plate 30 and the upper surface of the plate 31 to form a way or plate guiding surface 43 at one side of the plates and a way 44 at the opposite side of the plates 30 and 31. These ways 43 and 44 receive projecting portions 45 and 46 of the slide member 42.

The slide member 42 is held in either of two adjusted positions by a lever 47 (FIG. 1) an upwardly projecting portion of which extends into an aperture 49 (FIGS. 2, 3 and 4) formed in the slide 42. As shown in the drawings, the slide 42 is in its leftward adjusted position in FIGS. 1 and 2 where a surface 50 of it rests against a surface 51 on the guide block 31. As shown in FIGS. 3 and 4, the slide 42 is in its rightward position, in which position the right-hand end of the slide 42 abuts against a bracket 52 (FIG. 1) suitably attached to the standard 20.

The resilient guide member for engaging and guiding the left edge of the tape 39 comprises a spring 60 which is attached by means of machine screws 61 (FIG. 5) to the shank portion 62 of a substantially T-shaped slide designated generally by the numeral 63. The T-shaped slide 63 is slidably mounted in cooperating grooves 64 and 65 formed in the punch pin guide plate 30 and the die plate 31 and may be moved to any one of three adjusted positions by a lever 66 an upwardly extending projection 67 of which extends into an aperture 68 formed in the cross head of the T-shaped slide 63. The slide 63 is normally urged to the right by a hairpin spring 69 to the position shown in FIG. 2 where surfaces 70 and 72 thereof bear against cooperating surfaces 71 and 73 on the die block 31.

The T-shaped slide 63 has three adjusted positions as illustrated in FIGS. 2, 3 and 4; respectively, and may be moved to these positions by the lever 66. The lever 66 is normally urged to rock in a clockwise direction (FIG. 1) about a pivot stud 74, mounted in a bracket 75 attached to the base 62, by a compression spring 76. The spring 76 is interposed between the lever 66 and a surface of a bracket 77 extending from the standard 21. The compression spring 76 encircles the extending shank end of an adjustment screw 78 which adjusts the extent of counterclockwise movement which may be imparted to the lever 66.

The lever 47 is pivoted on a pivot stud 80 (FIG. 1) which is mounted in a bracket 81 secured to the base 62. The pivot stud 80 also pivotally supports an actuator lever 82 which has pivotally connected to it intermediate its ends, a link 83. The link 83 is pivotally attached to a lever 84 intermediate the ends of the lever 84, and one end of the lever 84 is pivoted to the lever 47 at 85. The end of the lever, opposite to that which is pivoted to the lever 47 at 85, is pivotally connected at 86 to a lever 87 which is in turn pivotally connected to the lever 66. The actuator lever 82 may be set in any one of three adjusted positions, thereby to adjust the position of the tape guiding surfaces which guide the edges of the tape by setting a spring pressed pin 88 mounted on the lever 82 in any one of three notches 89, 90 or 91 on a bracket 92 mounted on the base 22.

The standard dimensions which have been adopted for tape used in the various systems, to which the present invention pertains, are such that the right-hand edge of the tape 39, as shown in FIGS. 2, 3 and 4, must be guided in the position shown in FIG. 2 for the 5-level tape, and must be guided in the position shown in FIGS. 3 and 4 for the 6, 7 and 8-level tapes.

Similarly, the left edge of the tape must be guided in the position shown in FIG. 2 for the 5-level tape, in the position shown in FIG. 3 for the 6 and 7-level tape and in the position shown in FIG. 4 for the 8-level tape. Consequently, with the actuator lever 82 in the position shown in FIG. 1, the tape 39 will be guided at its right edge by the surfaces 40 and 41 and at its left edge by the spring 60 in the position shown in FIGS. 1 and 2.

When it is desired to perforate either 6 or 7 level tape, that is, tape ⅞" wide, the lever 82 may be moved to a point where the pin 88 registers with the notch 90 on the bracket 92. When the pin 88 is thus registered with the notch 90, the tape guiding spring 60 and the slide member 42 will be in the position shown in FIG. 3. In moving from the position shown in full lines in FIG. 1, to a position where pin 88 registers in the notch 90, the lever 82 will pull the link 83 downwardly. In moving downwardly, the link 83 will first rock the lever 47 clockwise to shift the slide member 42 to the right until the slide member 42 engages and is stopped by the bracket 52. During this movement of the slide member 42 to the right, the spring 76 will hold the lever 66 against movement in a counterclockwise direction (FIG. 1). As soon as the slide member 42 engages the bracket 52, slide member 42 will be stopped and the slight further movement of the lever 82 to the position where pin 88 registers with notch 90 will cause spring 76 to be compressed slightly as lever 66 is rocked counterclockwise a short distance thereby to move spring 60 to the position shown in FIG. 3. With the slide member 42 retracted to the position shown in FIG. 3, the right edge of the tape 39 will be guided by a tape edge guiding surface 93 which is a solid surface and the ⅞" wide tape will have its right edge held against the surface 93 by the spring 60.

When it is desired to handle 8-level (1" wide) tape in the perforator to which the present invention pertains, the actuator lever 82 may be rocked to its extreme counterclockwise position where the pin 88 will then register with the notch 89. When the actuator lever 82 is moved to this position, it will not move the lever 47 which is blocked from further movement by the interaction of the slide 42 and bracket 52, but will rock the lever 66 further in a counterclockwise direction about its pivot 74 thus to shift the T-shaped slide 63 to its extreme left hand position as viewed in FIG. 4. When this occurs, the spring 76 will be further compressed and the spring 60 will be moved to the position shown in FIG. 4 and will bear lightly against the left edge of the tape 39 to hold the tape 39 in engagement with the tape edge guiding surface 93.

Although a specific embodiment of the invention has been described hereinbefore, it will be understood that modifications thereof may be made without departing from the scope of the invention.

What is claimed is:

1. In a printing telegraph tape perforator, a punch block and a die plate having opposed spaced tape guiding surfaces forming top and bottom walls of a tape slot, a tape edge guiding surface comprising a side wall of said slot and formed on the die plate for guiding one edge of a tape of a first width, a slide member having a pair of projecting portions, said slide member being mounted on said die plate and movable to an operative position to carry the end surfaces of said projecting portions into the slot to guide a corresponding edge of a tape of a second width, a stop member, means forming an opposite side wall of said slot for guiding the opposite edge of tapes of both of said widths, and a common actuating means for independently moving said slide member to abut said stop member and for thereafter moving said means forming an opposite wall of said slot.

2. In a printing telegraph tape perforator, a punch block and a die plate having opposed spaced tape guiding surfaces forming two walls of a tape slot, a tape edge guiding surface comprising a side wall of said slot for guiding one edge of a tape of a first width, a first slidable member movable to a position to guide a corresponding edge of a tape of a second width, a stop member, a second slidable member forming an opposite side wall of said slot for guiding the opposite edge of tapes of both of said widths, and means for actuating said slidable members comprising an actuator lever movable to a plurality of positions, and a link and lever mechanism interconnecting said actuator lever with said first slidable member to move said first slidable member to abut said stop member and to move said second slidable member to one of a plurality of positions.

3. In a printing telegraph tape perforator, a punch block and a die plate having opposed spaced guide surfaces forming two walls of a tape slot, a tape guiding surface comprising a side wall of said slot for guiding one edge of a plurality of tapes having various widths, a first member movable from a non-tape engaging position to a tape engaging position for guiding a corresponding edge of a tape having a width differing from those guided by said side wall of said slot, means for stopping the movement of said first member in the non-tape engaging position, a second member forming an opposite side wall of said slot and movable to a plurality of positions for guiding the opposite edges of all widths of tapes, resilient means for biasing the second member to a first of a plurality of tape engaging positions, and means for moving said first member to abut said stop means in the non-tape engaging position and for moving said second member from the first of its tape guiding positions to another of its tape guiding positions against the bias of said resilient means only after said first member has been moved to its non-tape engaging position.

4. Apparatus for controlling the positions of two tape guide members with respect to each other and with respect to a base, the guide members being slidable toward and away from each other with respect to the base, said apparatus comprising, a biasing means for moving one guide member in one direction with respect to the base, first stop means limiting movement in the one direction of the one guide member, a second stop means limiting the movement of the other guide member in the same one direction, and a floating linkage means having independently movable arms connected to said guide members to move their respective guide members towards and away from said stops and an actuator lever means interconnecting said operable arms to exert a force simultaneously on both the independently movable arms thereby moving those guide members not limited by their stop means.

5. Apparatus for controlling the positions of two tape guide members with respect to each other and with respect to a base, the guide members being slidable toward and away from each other with respect to the base, said apparatus comprising floating linkage means mounted on the base and interconnecting the guide members for effecting relative movement of the guide members and for permitting free movement of the guide members with respect to the base, biasing means for moving one guide member in one direction with respect to the base, first stop means limiting movement of the one guide member by said biasing means in the one direction, whereby relative movement of the guide member by said linkage means tends to produce movement only of the other guide member with respect to the base, and second stop means limiting the movement of the other guide member in the same one direction with respect to the base, whereby continued relative movement of the guide members with respect to each other by said linkage means after the other guide member engages said second stop means causes movement of the one guide member away from said first stop means against the action of said biasing means.

6. A positioning device for varying widths of tape comprising a base, tape guiding means on said base for one edge of tape including a stationary guiding surface on said base for engaging the edge of one width of tape and a guide member slidable between a first predetermined position at which the member guides a tape of a width differing from that guided by said guiding surface and a second predetermined position at which the guide member concomitantly guides the edge of a tape with said tape guiding surface, a second guide member slidable on said base, floating linkage means mounted on the base and interconnecting the guide members for effecting relative movement of the guide members and for permitting free movement of the guide members with respect to the base, biasing means for moving one guide member in one direction with respect to the base, first stop means limiting movement of the one guide member by said biasing means in the one direction, whereby relative movement of the guide member by said linkage means tends to produce movement only of the other guide member with respect to the base, and second stop means limiting the movement of the other guide member in the same one direction with respect to the base, whereby continued relative movement of the guide members with respect to each other by said linkage means after the other guide member engages said second stop means causes movement of the one guide member away from said first stop means against the action of said biasing means.

References Cited in the file of this patent

UNITED STATES PATENTS

| | | |
|---|---|---|
| 1,547,642 | Casal | July 28, 1925 |
| 2,341,602 | Dewey | Feb. 15, 1944 |
| 2,372,499 | Kerner | Mar. 27, 1945 |
| 2,425,994 | Chilton | Aug. 19, 1947 |

FOREIGN PATENTS

| | | |
|---|---|---|
| 328,674 | Great Britain | Apr. 30, 1930 |